United States Patent

[11] 3,595,416

[72] Inventor Floyd E. Perrotti
 20906 120th Ave. S.E., Kent, Wash. 98031
[21] Appl No. 829,888
[22] Filed June 3, 1969
[45] Patented July 27, 1971

[54] FORK ATTACHMENT
 5 Claims, 5 Drawing Figs.
[52] U.S. Cl. ................................................ 214/767,
 214/145; 37/117.5
[51] Int. Cl. ............................................... E02f 3/28
[50] Field of Search ........................................ 214/147,
 147 G, 138, 767, 145; 37/117.5

[56] References Cited
UNITED STATES PATENTS
3,073,645 1/1963 Behrens ........................ 214/147 G X
3,077,999 2/1963 Svoboda ....................... 214/145
3,275,173 9/1966 Kampert et al. ............... 214/767
3,275,172 9/1966 Smith ........................... 214/147 X
3,485,396 12/1969 Lundquist ..................... 214/147 G Primary Examiner—Albert J. Makay
Attorney—Seed, Berry and Dowrey ABSTRACT: A conventional loader vehicle having forward push arms with a bucket secured at their terminal ends is provided with a replaceable fork-type rake attachment including a rake member having a plurality of tines extending downwardly below the bucket. The rake attachment is pivotally mounted on the bucket and includes power means for manipulating the rake member toward and away from the bucket. A pair of rearwardly directed log-supporting arms is secured to the rake member to hold an object when the rake member is pivoted toward the bucket. A plurality of forwardly directed teeth are provided on the rake member to serve as gripping members to prevent it from sliding up the object to be moved when the vehicle is being used to push over small trees and the like.

PATENTED JUL 27 1971 3,595,416

FLOYD E. PERROTTI
INVENTOR

BY Seed, Berry & Downey

ATTORNEYS

PATENTED JUL 27 1971  3,595,416

FLOYD E. PERROTTI
INVENTOR

BY

ATTORNEYS

FORK ATTACHMENT

BACKGROUND OF THE INVENTION

1. Field of the Invention

This invention pertains to field-clearing or earth moving equipment, and more particularly, to a rake attachment for a conventional piece of such equipment.

2. Description of the Prior Art

Conventional earthmoving or clearing equipment frequently use a clamshell-type bucket which is generally useful only for scraping or gathering operations. In some cases the movable portion of the bucket is provided with clamping elements and the like for grabbing or clamping objects against the fixed portion of the bucket. Other types of equipment are less frequently used in clearing operations and usually are designed for specialized operations, such as raising logs and the like.

SUMMARY OF THE INVENTION

It is a primary feature of this invention to provide a simple, inexpensive attachment that is suitable for use in a clearing operation. To this end rake means is attached to a bucket or other backing member on the vehicle and includes tines or rake teeth which extend below the bottom of the bucket. The bucket includes a fixed portion or backing member that serves as a backup for the tines during some manners of use. Stated differently the invention includes a replaceable front fork-type attachment which replaces the conventional movable portion of a clamshell bucket or the like and provides substantial utility and versatility for use in land clearing. The fixed portion of the bucket may be used to push, excavate and remove earth and debris. The rake member is readily usable for clearing and stacking brush.

Another feature of the invention is to provide a fork attachment which may also serve as a grabbing device which can seize poles, logs and the like. Basically for this purpose the rake member is provided with rearwardly directed log-supporting arms which coact with the fixed portion of the bucket to form a clamp.

Still another feature of the invention is to provide the rake member with forwardly directed teeth so that the attachment may be used on the vehicle to knock over small trees and the like without the rake sliding upwardly along the trees.

As will be readily apparent the rake attachment is easy to attach and simple to operate. It is extremely versatile in that raking, clearing and earthmoving operations may be performed simultaneously without the need to switch to another type of vehicle or attachment for removing an object and lifting it out of the path of the vehicle.

DETAILED DESCRIPTION OF THE PREFERRED EMBODIMENTS

Figure 1:
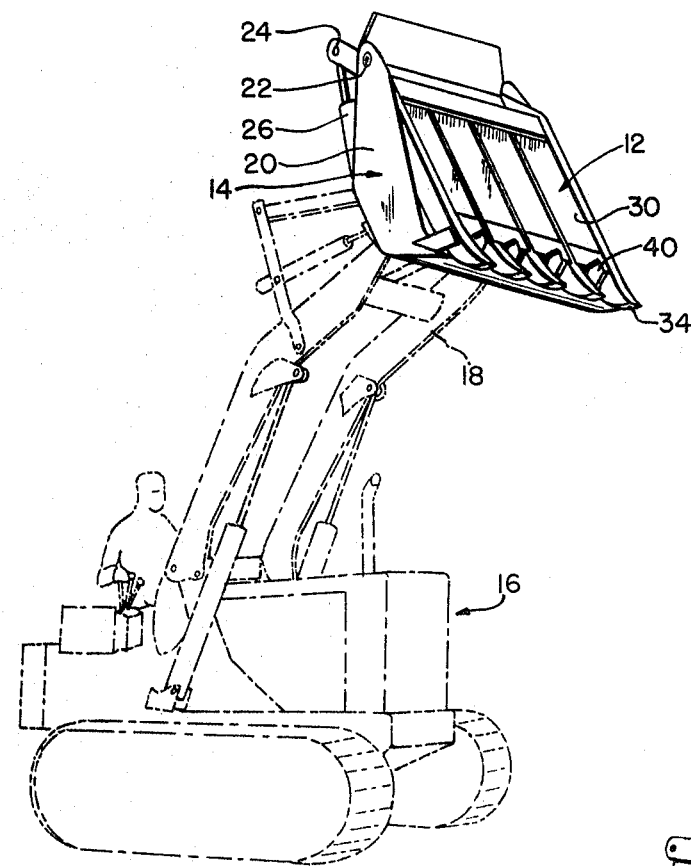
FIG. 1 is a perspective of a conventional vehicle equipped with an attachment embodying the principles of the invention.
Figure 2:
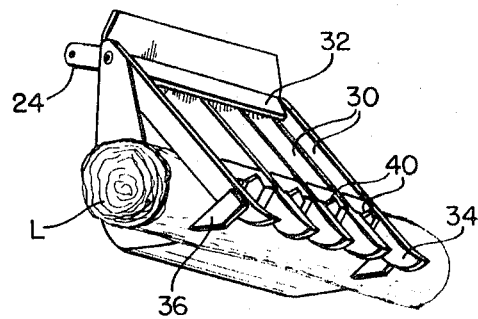
FIG. 2 is an isometric of the attachment shown grabbing an object.
Figure 3:
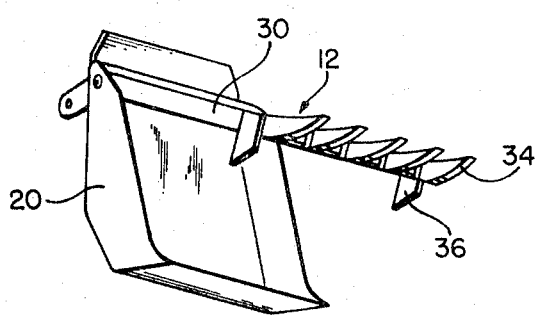
FIG. 3 is an isometric of the attachment shown in FIG. 2 with the rake member in an open position to grasp an object.

In brief, the preferred form of the invention includes a rake member 12 attached to the fixed portion of a bucket 14 of a conventional loader or clearing vehicle 16. The rake member may be used for raking and, as will be described in more detail below, also for grabbing objects such as logs. It may also be used for pushing trees and other objects over or out of the path of the vehicle. Thus, primarily the attachment functions as a field-clearing attachment readily used with conventional field-clearing equipment. The loader 16 is conventional and includes a pair of conventional push or manipulating arms 18 and a backing member 20 shown in the preferred embodiment as a bucket or the rear portion of a clamshell-type bucket. Other types of backing members such as are commonly used with log-handling forks and the like may also be employed. The rake member 12 is pivotally secured to an upper end of the fixed portion of the bucket by a pair of pivot rods 22. A lever arm 24 is rigidly secured to the upper end of the rake member 12 and is operative to pivot the rake member about the pivot rods 22. A pair of conventional two-way hydraulic cylinders 26, only one being shown, is secured between the lever arm 24 and the bottom of the bucket 20 to provide the power means for pivoting the rake member 12. As is readily apparent retraction of the cylinder rod 27 into the hydraulic cylinder will open the rake member whereas extension of the rod will pivot the rake member rearwardly against the backing member 20. Obviously, when the operator desires to use the fixed portion of the bucket only the rake member may be pivoted upwardly out of the way.

Figure 4:
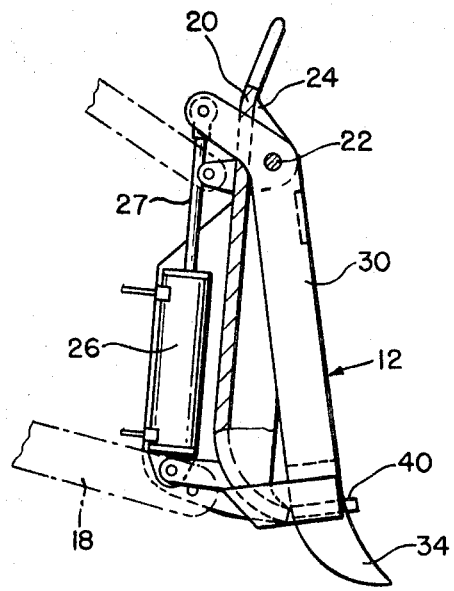
FIG. 4 is a vertical section of the attachment shown in FIG. 1.

The rake member 12 is provided with a plurality of equidistantly spaced rake tines or teeth 30 secured at their upper ends to a cross brace 32 and to a similar cross brace 33 near the lower ends thereof. The lower ends of the tines are provided with heavy-duty working surfaces 34 which extend downwardly beyond the bucket 20 when the rake member is retracted against the bucket as best shown, for example, in FIG. 4. As thus positioned the rake member serves as a rake which may be used for digging into the soil or for clearing debris from on top of the ground.

Figure 5:
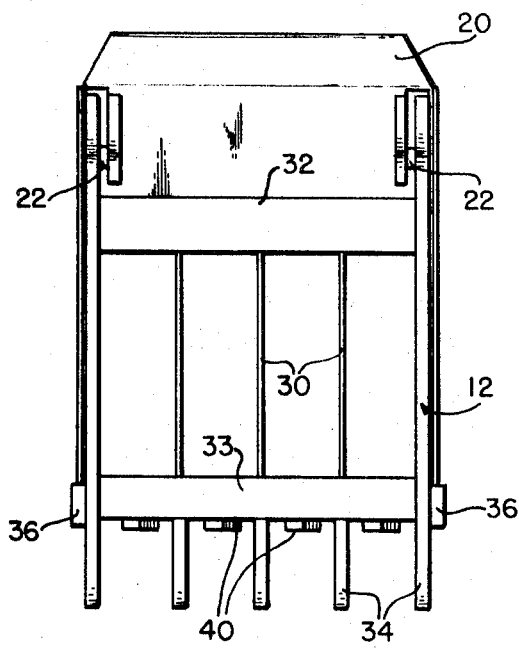
FIG. 5 is a front elevation of the attachment.

The outermost tines 30 of the rake member 12 are each provided with a rearwardly depending log-supporting arms 36. As best shown in FIGS. 1 and 5 the log-supporting arms are positioned laterally outside of the bucket 20. When the rake member is retracted against the bucket 20 an object, such as a log L, may be supported on the arms, clamped against the bucket and raised for removal out of the path of the vehicle and deposited elsewhere.

The cross brace 33 of the rake member 12 is provided with a plurality of spaced teeth 40. The teeth are preferably replaceable in a conventional manner. Gripping or restraining surfaces other than teeth may also be employed. The purpose of the teeth is to preclude the rake member from sliding or climbing up an object, such as a tree, that is being pushed over or out of the path of the loader. When the loader 16 is being used to push over a tree, for example, the teeth 40 will dig into the tree preventing the rake member from sliding up the surface of the tree.

As is readily apparent changes in the details of the construction of the preferred embodiment may be resorted to without departing from the spirit of the invention and, accordingly, the scope of the invention is to be determined solely by the interpretation of the appended claims.

The embodiments of the invention in which an I claim exclusive property or privilege are defined as follows:

1. A rake attachment for a mechanical loader or the like having a mobile frame, a pair of powered manipulating push arms and a backing member mounted between the outer ends of said arms, the improvement comprising;
   a rake member pivotally mounted at its upper end to said backing member and extending substantially vertically downwardly operable to be engaged by said backing member and terminating in a plurality of teeth extending downwardly below the bottom portion of said backing member,
   means for pivoting said rake member toward and away from said backing member whereby when the apparatus is used for raking the backing member braces the rake member against rearward movement and the raking member may be pivoted upwardly allowing the use of the backing member for operations other than raking.

2. The rake attachment defined by claim 1 wherein said rake member further includes at least two spaced, rearwardly directed log-supporting arms.

3. The rake attachment defined by claim 1 wherein said rake member includes a plurality of forwardly directed teeth.

4. The rake attachment defined by claim 1 wherein said backing member is a dish-shaped scoop member.

5. The rake attachment of claim 4 including at least one rearwardly extending lever arm secured to the upper end of said rake member and wherein said power means includes at least one two-way hydraulic cylinder secured at one end to a lower rear surface of said backing member and having a cylinder rod pivotally secured to said lever arm.